United States Patent Office 3,453,679
Patented July 8, 1969

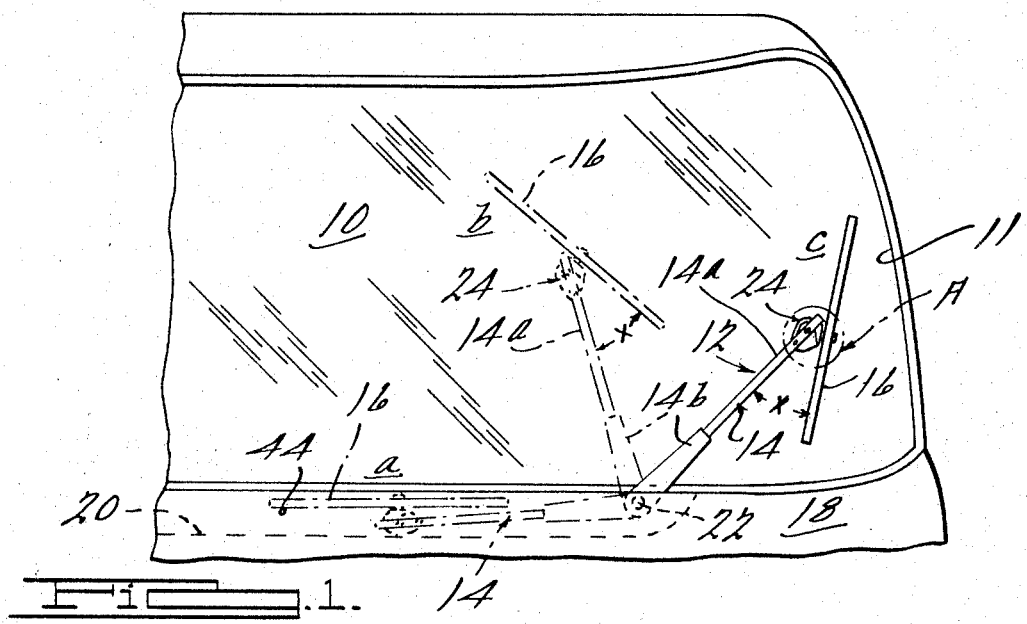
Fig. 1.
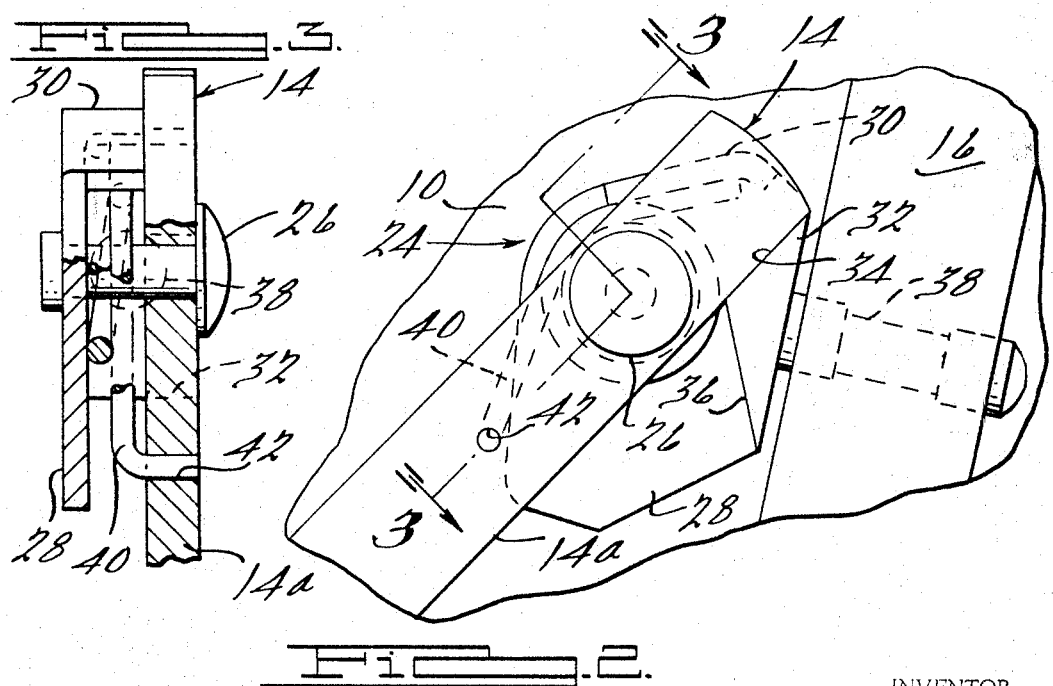
Fig. 3.
Fig. 2.
INVENTOR.
Daniel O. Thorlakson
BY
Harness, Talbutt & Baldwin
ATTORNEYS.

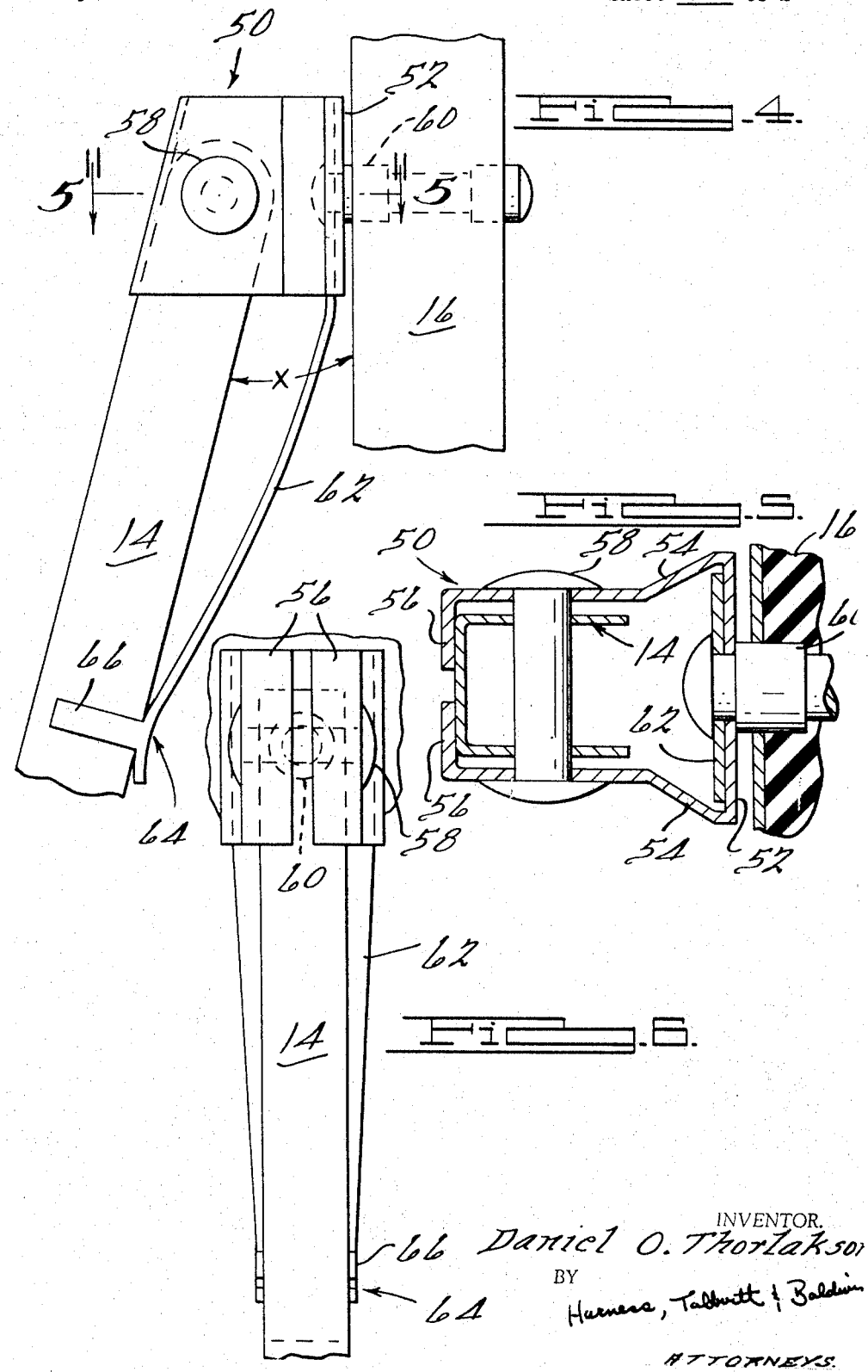

---

3,453,679
WINDSHIELD WIPER ARRANGEMENT
Daniel O. Thorlakson, Birmingham, Mich., assignor to Chrysler Corporation, Highland Park, Mich., a corporation of Delaware
Filed Sept. 5, 1967, Ser. No. 665,385
Int. Cl. B60s 1/40, 1/34
U.S. Cl. 15—250.16     3 Claims

ABSTRACT OF THE DISCLOSURE

A windshield wiper having an improved form of connection between the wiper arm and blade so that the blade will wipe a greater area of the outboard wing portions of the windshield. A connector at the free end of the wiper arm allows the blade to pivot relative to the longitudinal axis of the arm, and a biasing member maintains the blade and wiper arm at a constant angle during oscillation of the wiper arm. A stud member is positioned adjacent the lower horizontal edge of the windshield for contact with the blade when the windshield wiper is moved to the park position. Contact of the blade with the stud causes the blade to pivot until generally parallel with the wiper arm thereby providing a neat appearance and a flat profile for use in conjunction with a concealed windshield wiper system.

---

Background of the invention

The present invention relates to windshield wipers and more particularly to a wiper blade and wiper arm arrangement whereby the angle or arc of wiping at the lower outboard portions of the windshield may be increased without increasing the actual angle through which the wiper arm oscillates.

For some years curved windshields have presented problems with respect to providing suitable wiper arrangements. For example, windshields of the so-called "wraparound" type had severely curved end portions which made it difficult to keep a wiper blade in contact with the windshield surface throughout all portions of wiper travel. Having overcome this problem, the designers of windshield wiper systems are now confronted with windshields which are substantially wider at the base or lower edge adjacent the cowl of the vehicle than at the top or upper edge adjacent the roof of the vehicle. Such windshields present a new problem since most windshield wiper systems employ a blade and actuating arm therefor in which the longitudinal axis of the blade is held relatively fixed and generally parallel to the longitudinal axis of the arm. Accordingly, the inner end of the blade traverses a smaller arc than its outer end and a substantial angular area adjacent the outboard portions of the windshield is unwiped. In order to overcome this problem, a great amount of effort has been expended. Thus, many devices were experimented with in which the blade was merely pivotally attached to the wiper arm. Unfortunately, such devices have not proved successful since they depend on the frictional forces developed between the wiper blade and windshield to determine the degree and frequency of pivot. As such frictional forces widely vary due to conditions of wear, climate and speed of operation, the blade was generally found to move across the surface of the glass in an uncontrolled manner.

Subsequent research effort was directed towards developing systems wherein the wiper blade is pivoted with respect to the arm during a portion of the swing of the arm so that the blade assumes a more vertical position at the outboard or wing portion of the windshield. In general, this is accomplished by means of a rod which extends from the blade along the actuating arm and to a cam device associated with the oscillating shaft of the wiper. However, while this type of device, frequently referred to as a parallelogram system, overcomes the problem, it has certain disadvantages which limit its utility. Thus, the parallelogram system requires many moving parts which are readily susceptible to wear from normal usage. For example, the pivot connection between the blade and arm, and the cam follower are in constant motion during every stroke of the wipers. Such constant movement results in wear which soon leads to varying frictional resistances which cause inaccuracy of performance. A further disadvantage is that experience has shown that such systems are susceptible to damage in the process of freeing the wiper from an ice covered surface. Yet another disadvantage is that such parallelogram systems tend to be bulky and, hence, limiting with respect to their use in concealed wiper systems. Finally, due to their complexity, such systems are costly from the standpoint of original purchase and maintenance.

Summary of the invention

From the foregoing, it will be recognized that a windshield wiper arrangement is needed which is capable of providing an increased wipe area especially at the lower outboard portions of a windshield and, yet, is simple in construction and inexpensive to manufacture and maintain. Moreover, the arrangement must be capable of wiping a predetermined area each time it is used and be non-bulky so as to be compatible with hidden windshield wiper systems.

Accordingly, it is an object of this invention to provide an improved windshield wiper arrangement capable of providing a positive and consistent wipe pattern for a substantial portion of the surface of a windshield.

A further object is to provide a windshield wiper arrangement especially suited to clear the lower outboard portions of a windshield having upwardly converging lateral edges.

More specifically, an object of the invention is to provide means for changing, to a predetermined degree, the angle of the wiping blade to the actuating arm in a controlled manner.

Yet another object is to provide means for changing the angle of the wiping blade to the actuating arm which is simple, rugged, economical and compact so as to be adaptable for use with a concealed windshield wiper arrangement.

Other objects and advantages of the present invention will become apparent from a further reading of the description and the appended claims.

Briefly, the windshield wiper arrangement of the invention comprises a wiping blade and an actuating or wiper arm operable to move the blade from a park position to a wiping position in which the blade oscillates on the windshield surface. The wiper arm and blade are pivotally interconnected near the free end of the wiper arm so that the blade can pivot from a first position generally parallel to the wiper arm to a second position wherein the longitudinal axes of the blade and arm are at an angle. In this second position, the portion of the blade adjacent the wiper arm is displaced outwardly from the arm with the effect that the blade assumes a more vertical position at the completion of the wiper stroke adjacent the outboard edge of the windshield. Biasing means normally hold the blade in this second position, and the angle between the wiper blade and arm is held essentially constant throughout oscillation of the blade during operation of the windshield wipers.

A stationary member is positioned adjacent the lower edge of the windshield in engageable relationships with the wiper blade when the latter is moved to the park position. Contact of the blade with the stationary member causes the blade to pivot with respect to the arm and assume a position generally parallel to the arm and against the lower horizontal edge portion of the windshield so as not to obstruct the vision of the occupants of the vehicle.

From the foregoing it is apparent that the arrangement of this invention overcomes the problems set forth above. Thus, the blade is pivoted to a fixed position when the windshield wiper system is in a run position so as to clean the angular area normally left unwiped by conventional systems. However, the blade does not undergo pivotal movement relative to the actuating arm as it oscillates and, therefore, the structure is not subjected to the degree of wear encountered with presently known actuating wiper systems. Likewise, the degree of pivot is not dependent on the resistance of the blade against the windshield and, hence, the blade moves in a constant and controlled path. Lastly, the arrangement of this invention, requiring only a relatively small pivotal connector at the free end of the wiper arm, does not have the bulk of parallelogram systems and, therefore, can easily be incorporated into a hidden windshield wiper system wherein, as will be readily understood by those in the art, the windshield wipers, when in the park position, are disposed beneath a cover in the cowl of the vehicle or between the windshield and an upturned flange portion of the hood.

*Description of the drawings*

In the accompanying drawings, of which two of various possible embodiments are illustrated, FIGURE 1 is a fragmentary front elevational view of a windshield incorporating the wiper construction of the present invention showing one wiper in various run positions and in the parked position;

FIGURE 2 is an enlarged view of the area designated as A in FIGURE 1;

FIGURE 3 is a sectional view taken along the line 3—3 of FIGURE 2;

FIGURE 4 is a view similar to FIGURE 2 showing a modified embodiment of the invention;

FIGURE 5 is a sectional view taken along the line 5—5 of FIGURE 4; and

FIGURE 6 is a side elevational view of the embodiment shown in FIGURE 4.

Like parts are indicated by corresponding reference characters throughout the several views of the drawings.

*Description of the embodiments*

Referring to FIGURE 1, a vehicle is shown having a single piece rearwardly inclined panoramic windshield 10 having upwardly converging lateral edge portions 11. Mounted adjacent the lower edge of the windshield for oscillatory pivotal movement is a windshield wiper, indicated generally by reference number 12, having an actuating or wiper arm 14 and a blade 16. The windshield wiper 12 is shown in its parked position in phantom line at *a*, at an intermediate position in phantom line at *b* and at the outboard end of its stroke in solid line at *c*. Although not essential to this invention, the windshield wiper arrangement is illustrated in conjunction with a hidden system, such as illustrated in U.S. Patent 2,947,020, wherein the windshield wiper 12 when in the park position is disposed within a gap formed between the windshield 10 and the vehicle hood 18 which adjacent the windshield is bent upwardly in a curved, convex-like manner. A moulding 20 conceals the lower horizontal edge of the windshield.

The windshield wiper when in a wiping or operating position oscillates through a defined stroke pattern having certain outboard and inboard limits, and when inactivated moves to a depressed park position. The windshield wiper is carried by a rockshaft 22 which is driven by a motor (not illustrated) of any suitable type and the wiper arm 14 can be of any type such as a two section arm having an outer section 14*a* and an inner section 14*b* which is mounted on the outer end of rockshaft 22 for oscillation therewith. The two sections of the actuating arm 14*a*, 14*b* can be connected and the outer arm section 14*a* biased toward the surface of the windshield 10 in any known manner. The blade 16 can, likewise, be of any various known types.

The subject matter of the present invention is primarily directed to a connection means, as shown in the area designated at A in FIGURE 1, which serves to operatively connect the wiper or actuating arm 14 with the wiper blade 16. As seen with reference to FIGURES 2 and 3, a connector indicated generally by reference numeral 24 is pivotally attached to the free end portion of actuating arm 14 by a fastener 26 which extends through the actuating arm 14 and connector 24. The connector 24 comprises a base portion 28 having a side wall 30 and a stop member 32. Stop member 32 extends upwardly from the base portion 28 a sufficient distance to be engageable with the actuating arm 14 and is provided with spaced stop surfaces 34 and 36 which coact with actuating arm 14 to define the degree of pivot or angular displacement of the wiper blade 16 relative to actuating arm 14.

As seen with reference to FIGURE 2, the wiper blade 16 is detachably connected to connector 24 by means of a pin 38 extending outwardly from the stop member 32. Accordingly, pivotal movement of the connector 24 will carry wiper blade 16 from a position wherein stop surface 34 is engaged with actuating arm 14 and the longitudinal axes of the blade and arm are at an angle, as seen in FIG. 2, to a position wherein stop surface 36 engages actuating arm 14 and the actuating arm and wiper blade are generally parallel.

In order to properly position the wiping blade 16, a spring member 40 is carried by the connector 24. Spring member 40 is disposed about fastener 26 and has one portion in engagement with wall portion 30 of connector 24 and its other end portion secured in an aperture 42 formed in actuating arm 14. Spring member 40 biases stop surface 34 of the connector into engagement with actuating arm 14 and, accordingly, the blade 16 is maintained at an angle $x$ to the actuating arm 14. As seen in FIG. 1, this angle is maintained throughout the complete stroke or oscillation of the blade on the windshield surface.

In the park position it is desirable that the blade 16 assumes a position generally parallel to the actuating arm 14 so as to be inconspicuous. Accordingly, a stationary member such as pin 44 is disposed adjacent the lower horizontal edge of the windshield so as to be in engageable relationship with at least a portion of the blade 16 which extends outwardly from actuating arm 14. Accordingly, as seen with reference to FIGURE 1, when the actuating arm moves to a depressed park position, the blade engages pin 44 and further movement of the actuating arm overcomes the force of spring 40 with the result that the connector 24 pivots until stop surface 36 engages arm 14 at which time blade 16 is essentially parallel to the actuating arm. The stationary member can be formed on the moulding 20 as is pin 44, or on the cowl or any other structure which will place it in the path of the blade upon its being depressed to a park position.

*Second embodiment*

According to another variation of the invention, pivotal movement of the wiper blade 16 may be accommodated by a clevis arrangement as illustrated in FIGURES 4, 5 and 6. The generally U-shaped clevis, indicated generally by reference numeral 50, may be formed from flat sheet material and cut and bent to the desired shape. As seen in FIGURE 5, clevis 50 has a central body portion 52 and two legs 54, 54 extending outwardly from the central body portion with inturned end portions 56, 56. Clevis 50 is pivotally connected to the free end portion of actuating arm 14 by a fastener 58 which penetrates the clevis leg portion 54, 54 and the arm 14, and the wiper blade 16 is detachably connected to the clevis 50 by means of a pin 60 extending from clevis central body portion 52.

A cantilever spring 62 is carried by the clevis and, as seen in FIG. 5, secured to central body portion 52 by pin 60. Spring 62 extends outwardly along the actuating arm 14 and has an end portion 64 in engagement therewith. Pivotal movement of clevis 50 causes end portion 64 to slide on the surface of the actuating arm 14 and, therefore, guide tabs 66 are provided. Spring 62 normally biases the clevis to a position wherein an end portion 56 engages the blade 14 and, therefore, blade 16 is held at an angle X to the actuating arm during oscillation of the blade on the windshield. As in the first embodiment described above, the blade 16 is brought into a generally parallel position with the actuating arm 14 when moved to the park position by contact of the blade with a stationary member as stud 44. Such contact causes the clevis to pivot about pin 58 with movement of spring 62 relative to actuating arm 14. Although not necessary, the clevis, for appearance purposes, is shown in FIGURE 4 as having the leg portions 54, 54 cut on a bias, and mounted with a portion thereof extending beyond the free end of actuating arm 14 so as to enable pivotal movement.

In operation, the arrangements of either the first or second embodiment will result in the wiper blade being maintained at a predetermined and constant angle relative to the actuating arm throughout oscillation of the blade on the windshield. When the wipers are inactivated, the blade engages the stationary member adjacent the lower horizontal edge of the windshield, and further downward movement of the arm overcomes the spring of the connector and the blade pivots to position generally parallel with the actuating arms. Upon actuation of the windshield wipers, the spring will cause the connector to pivot as soon as upward movement of the actuating arm commences, and the blade will be carried to its angular displaced position.

From the foregoing, it is believed apparent that the objects of this invention have been obtained and it will be understood that modifications and variations may be effected without departing from the scope of the novel concepts of the present invention as defined in the appended claims.

I claim:
1. A windshield wiper arrangement comprising a wiping blade, an actuating arm mounted for oscillation and operable to move the blade from a park position to a wiping position in which the blade oscillates on a windshield surface, a clevis interconnecting the wiping blade and actuating arm for enabling angular displacement of the blade laterally of the arm from a first position wherein the longitudinal axis of the blade and arm are generally parallel to a second position wherein said axes are at a predetermined angle with respect to each other, said clevis being pivotally mounted on the free end portion of said actuating arm and having a center portion and two leg portions, said clevis being secured to said free end portion by a first fastener with said first fastener forming the pivot axis for the clevis and said center portion carrying a second fastener with said wiping blade being detachably connected to said second fastener, a spring member carried by said clevis for maintaining the wiping blade and the actuating arm in said second position when said blade is in a wiping position, and a stud member in engageable relationship with the blade when said blade is moved to said park position, said engagement resulting in the blade and arm assuming said first position when in the park position.

2. A windshield wiper arrangement according to claim 1 wherein said spring member has one end portion engaged with said clevis and its opposite end engaged with said actuating arm.

3. A windshield wiper arrangement comprising a wiping blade, an actuating arm mounted for oscillation and operable to move the blade from a park position to a wiping position in which the blade oscillates on a windshield surface, a clevis interconnecting the wiping blade and actuating arm for enabling angular displacement of the blade laterally of the arm from a first position wherein the longitudinal axes of the blade and arm are generally parallel to a second position wherein said axes are at a predetermined angle with respect to each other, said clevis being pivotally mounted on the free end portion of said actuating arm and having a center portion and two leg portions, said clevis being secured to said free end portion by a first fastener with said first fastener forming the pivot axis for the clevis and a second fastener being carried by said clevis with said wiping blade being detachably connected to said second fastener, a spring member carried by said clevis for maintaining the wiping blade and the actuating arm in said second position when said blade is in a wiping position, and a stationary member adjacent an edge of the windshield for engagement with the blade when the blade is moved to said park position, said engagement resulting in the blade and arm assuming said first position when in the park position.

References Cited
UNITED STATES PATENTS 2,286,004   6/1942   O'Shei _____ 15—250.32 XR

FOREIGN PATENTS 772,971   4/1957   Great Britain.

PETER FELDMAN, *Primary Examiner.*

U. S. Cl. X.R.

15—250.23, 250.32